US009363672B2

(12) United States Patent
Bahr et al.

(10) Patent No.: US 9,363,672 B2
(45) Date of Patent: Jun. 7, 2016

(54) METHOD AND NETWORK NODE DEVICE FOR CONTROLLING THE RUN OF TECHNOLOGY SPECIFIC PUSH-BUTTON CONFIGURATION SESSIONS WITHIN A HETEROGENEOUS OR HOMOGENOUS WIRELESS NETWORK AND HETEROGENEOUS OR HOMOGENOUS WIRELESS NETWORK

(71) Applicant: SIEMENS AKTIENGESELLSCHAFT, Munich (DE)

(72) Inventors: Michael Bahr, Munich (DE); Rainer Falk, Poing (DE); Parag Mogre, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 14/391,964

(22) PCT Filed: Apr. 11, 2013

(86) PCT No.: PCT/EP2013/057615
§ 371 (c)(1),
(2) Date: Oct. 10, 2014

(87) PCT Pub. No.: WO2013/153171
PCT Pub. Date: Oct. 17, 2013

(65) Prior Publication Data
US 2015/0052357 A1 Feb. 19, 2015

(30) Foreign Application Priority Data
Apr. 11, 2012 (EP) ..................................... 12163683

(51) Int. Cl.
*H04L 9/32* (2006.01)
*H04W 12/06* (2009.01)
(Continued)

(52) U.S. Cl.
CPC ............... *H04W 12/06* (2013.01); *H04L 63/08* (2013.01); *H04W 12/04* (2013.01)

(58) Field of Classification Search
CPC ....................................................... H04W 12/06
USPC .......................................................... 713/168
See application file for complete search history.

(56) References Cited

U.S. PATENT DOCUMENTS

2012/0227090 A1* 9/2012 Shibuya ................ H04W 12/06
726/4
2013/0089001 A1* 4/2013 Dattagupta ........... H04W 48/20
370/255

FOREIGN PATENT DOCUMENTS

EP 12 163 683.1 4/2012
WO PCT/EP2013/057615 4/2013

OTHER PUBLICATIONS

"Wi-Fi Protected Setup Specification (Version 1.0)," Wi-Fi Alliance, Sep. 2006, pp. 1-109.
(Continued)

*Primary Examiner* — Peter Shaw
(74) *Attorney, Agent, or Firm* — Slayden Grubert Beard PLLC

(57) ABSTRACT

A method and network node device control the run of technology specific Push-Button Configuration sessions within a heterogeneous or homogeneous wireless network as well as a heterogeneous or homogeneous wireless network detecting a session overlap within the network. The session is related to a configuration session (bootstrapping session, setup session) that establishes a security configuration for encrypted communication over a wireless link it is proposed an enhanced mechanism for controlling the run of technology specific Push Button Configuration sessions within a heterogeneous or homogeneous wireless network and a plurality of network node devices interconnected to each other via at least one interface and/or over multiple hops and authenticated or unauthenticated for the network by using a piece of information, e.g. a "Configuration Setup Session Identifier (CSSID)," for identifying a technology specific Push Button Configuration setup session.

18 Claims, 11 Drawing Sheets

(51) Int. Cl.
H04L 29/06 (2006.01)
H04W 12/04 (2009.01)

(56) References Cited

OTHER PUBLICATIONS

P. Klein et al., "IEEE P1905.1, Draft Standard for a Convergent Digital Home Network for Heterogeneous Technologies: Proposal for CDHN Standard," Sep. 2011, pp. 1-79.
P. Houze et al., "IEEE P1905.1TM/D02 Draft Standard for Convergent Digital Home Network for Heterogeneous Technologies," Dec. 2011, pp. 1-80.
Wi-Fi Protected Setup™, related to url: http://www.wi-fi.org/wifi-protected-setup, retrieved on Oct. 17, 2014 via url: https://web.archive.org/web/20100301170610/http://www.wi-fi.org/wifi-protected-setup, corresponding webpage archived on Mar. 1, 2010, 2 pages.
"Wi-Fi Protected Setup," *Wikipedia*, url: http://en.wikipedia.org/wiki/Wi-Fi_Protected_Setup, last edited Nov. 2011, retrieved Dec. 2013, 3 pages.
"Bluetooth," *Wikipedia*, url: http://en.wikipedia.org/wiki/Bluetooth#Pairing.2FBonding, last edited Dec. 2011, retrieved Dec. 2013, 22 pages.
"Wireless intrusion prevention system," *Wikipedia*, url: http://en.wikipedia.org/wiki/Wireless_intrusion_prevention_system, last edited Nov. 2011, retrieved Dec. 2013, 4 pages.
J. Farchchi, Wireless Intrusion Detection Systems, *Symantec Connect Community*, http://www.symantec.com/connect/articles/wireless-intrusion-detection-systems, created Nov. 2003, updated Nov. 2011, retrieved Dec. 2013, 6 pages.
A. Wood et al., "Security of Distributed, Ubiquitous, and Embedded Computing Platforms," *Wiley Handbook of Science and Technology for Homeland Security*, url: http://www.cs.virginia.edu/~stankovic/psfiles/hhs06-security.pdf., Mar. 2009, pp. 1-14.
"Multiple WLANs," *DD-WRT Wiki*, url: http://www.dd-wrt.com/wiki/index.php/Multiple_WLANs, retrieved Dec. 2013, 9 pages.
"WiFi Access Point with Multiple SSID and VLAN support," *Zeroshell Net Services*, url: http://www.zeroshell.net/eng/wireless-access-point/#wifi-manager, retrieved Dec. 2013, 5 pages.
"Connecting to multiple IEEE 802.11 networks with one WiFi card," *Virtual Wi-Fi Home*, url: http://research.microsoft.com/en-us/um/redmond/projects/virtualwifi/, created 2002, last updated 2006, retrieved Dec. 2013, 2 pages.
"Virtual WiFi macht Windows 7 zum Access Point," url: http://blogs.technet.com/b/dmelanchthon/archive/2009/09/24/virtual-wifi-macht-windows-7-zum-access-point.aspx, Sep. 2009, retrieved Dec. 2013, 20 pages.
"Wi-Fi Protected Setup Specification (Version 1.0h)," Wi-Fi Alliance, Dec. 2006, pp. 1-110.
International Search Report mailed Aug. 7, 2013 for corresponding International Patent Application No. PCT/EP2013/057615.

* cited by examiner

METHOD AND NETWORK NODE DEVICE FOR CONTROLLING THE RUN OF TECHNOLOGY SPECIFIC PUSH-BUTTON CONFIGURATION SESSIONS WITHIN A HETEROGENEOUS OR HOMOGENOUS WIRELESS NETWORK AND HETEROGENEOUS OR HOMOGENOUS WIRELESS NETWORK

CROSS REFERENCE TO RELATED APPLICATIONS

This application is based on and hereby claims priority to International Application No. PCT/EP2013/057615 filed on Apr. 11, 2013 and European Application No. 12 163 683 filed on Apr. 11, 2012, the contents of which are hereby incorporated by reference.

BACKGROUND

The invention relates to a method for controlling the run of technology specific Push Button Configuration sessions within a heterogeneous or homogeneous wireless network, a first network node device for controlling the run of technology specific Push Button Configuration sessions within a heterogeneous or homogeneous wireless network, a computer readable storage media executable by a processor for controlling the run of technology specific Push Button Configuration sessions within a heterogeneous or homogeneous wireless network and a heterogeneous or homogeneous wireless network for controlling the run of technology specific Push Button Configuration sessions.

The current data-centric use of networks (Internet access, media streaming) is increasingly extended towards home control functionality (home automation for climate control, lighting, burglar alarm, home energy network). Such home networks use according to FIG. 1 for instance various communication network technologies like Ethernet (IEEE 802.3), WLAN/WiFi (IEEE 802.11), and Power Line Communication (PLC; IEEE 1901). For this reason they are heterogeneous. The standard IEEE P1905.1, which according to D02 Draft Standard for Convergent Digital Home Network (CDHN) for Heterogeneous Technologies from Dec. 14, 2011, 1905_1-11-0067-00-WGDC-proposal-for-cdhn-standard.doc ("CDHN Draft") is currently under development, defines a home network standard supporting different network technologies by a specified "IEEE P1905.1"-Abstraction Layer.

The design of the abstraction layer is based on the ISO/OSI-Reference Model with a management and data plane as shown in FIG. 2. The abstraction layer is embedded in an IEEE P1905.1-Architecture above a Media Access Control (MAC)-layer and a Physical layer as part of a "Network Node Device" NND within the heterogeneous network. Thus, the network node device NND uses the cited technologies like Ethernet (IEEE 802.3), WLAN/WiFi (IEEE 802.11), and Power Line Communication (PLC; IEEE 1901) and additionally a technology according to the specification of the Multimedia over Coax Alliance (MoCA) via corresponding interfaces according to FIG. 2. It is not compulsory or mandatory for a typical network node device to support all cited communication technologies. It is possible that the network node device NND supports only one or two of the cited technologies or completely other network technologies. Thus the network node device NND supports at least one network technology.

At least one goal of the IEEE P1905.1 standardization activities are security mechanisms. They are needed to protect the home network from external attacks. Such security mechanisms have to be configured with a security credential (password, passphrase, cryptographic key) that is burdensome to set-up manually.

The specific problem of using a Push-Button Configuration (PBC) in an "IEEE P1905.1"-network comes from the fact that multiple devices (belonging even to different technologies) are activated to accept a new device. So in the current version of the standard, more than one device could register with the "IEEE P1905.1"-network after a single button press. An attacker node may therefore register undetected when an authorized registration of a new device takes place. Further, even in a scenario where there is no attacker node, if multiple existing nodes of the home network (for e.g. access points) activate their technology specific PBC mode simultaneously it may lead to failure of the new node's attempts to join the network. This is specifically the case when the access points (or the nodes involved in registering the new node in the network via the technology specific PBC) are IEEE 802.11 (WLAN) access points supporting as a Push-Button Configuration in the WLAN environment a Wi-Fi Protected Setup (WPS). Taking this into account a technology specific Push-Button Configuration is a Push-Button Configuration, which is used specifically for each of the communication network technologies within the heterogeneous network. In other words the aforementioned PBC and WPS is each a technology specific Push-Button Configuration or belongs each to the technology specific Push-Button Configuration.

Currently in heterogeneous convergent digital home networks for ease of use a push button method is provided in order to allow the end-user to easily setup the security credentials and permit new network devices to join the convergent digital home network. An example for this is the mechanism provided in the IEEE P1905.1 draft standard under development. Here using the P1905.1 push button mechanism, technology specific push button configurations (PBC) are activated on authenticated devices in the home network. This enables the new device joining to carry out a technology specific PBC itself with a suitable device (based on range, connectivity, and media type) to get security credentials to join the home network.

One of the basic problems with this is, that multiple technology specific push button configurations (PBC) triggered by the same push button event may actually fail because they recognize each other as a conflicting PBC run. This is especially the case in Wi-Fi Protected Setup (WPS) with "Wi-Fi"-devices.

Wireless communication equipment as e.g., a WLAN device has to be configured before it can be used. In particular, a cryptographic key may be required to be configured. An important standard for user-friendly configuration of WLAN devices is Wi-Fi Protected Setup (WPS) that supports a push-button configuration PBC between two devices. However, the general applicability is limited. So there is a need for an improved wireless configuration setup method.

The mechanisms provided however are limited, for example, they do not work for the case of home networks where multiple registrars are present. WPS Specification 1.0

Furthermore in the IEEE P1905.1 solution the technology specific PBC is started only by the registrar, which implies that for the case where the new device is not within range of the registrar, but within the range of another "Wi-Fi"-access point the PBC attempt fails.

Additionally, the registrar is a logical entity and can be separated from the access points. In this case the registrar itself might not have the capability to start a "Wi-Fi" specific PBC at all. This will prevent any nodes from joining the network using the "Wi-Fi" technology specific PBC.

The closest technical solution is defined in Wi-Fi Protected Setup (WPS). Described is a monitoring for simultaneous push-button configurations (PBC). If a session overlap is detected, the push button configuration fails.

Section 9 of the CDHN Draft defines rudimentary signalling procedures for an automatic cross-technology security setup (multi-standard push button configuration). A node may send a PBC event to other nodes of the network to initiate a configuration session. The event includes an event ID. However, the event ID is used only by the nodes belonging already to the network. It is not indicated towards the new node. The new node can therefore not distinguish whether PBC messages received from different nodes belong to the same PBC session or to different sessions. The new node can therefore not reliably distinguish a session overlap between different networks from the situation where multiple nodes of a single network are active in a single PBC session.

Bluetooth defines Pairing procedures (legacy and secure simple pairing) to set-up a secret key between two Bluetooth devices (see: http://en.wikipedia.org/wiki/Bluetooth#Pairing.2FBonding). Pairing may be initiated/confirmed by the user. The user may be required to enter a PIN or to verify a parameter.

Wireless Intrusion Detection/prevention System (WIDS) monitor the radio communication and may signal an unexpected communication node (see e.g., http://en.wikipedia.org/wiki/Wireless_intrusion_prevention_system and http://www.symantec.com/connect/articles/wireless-intrusion-detection-systems).

Secure Broadcast/Multicast protocols are known (TESLA/uTESLA) where the key used to protect broadcast messages/multicast messages that is valid for sending messages during a certain time period is revealed to the receivers only after the time period has passed (see e.g., http://www.cs.virginia.edu/~stankovic/psfiles/hhs06-security.pdf)

Virtual WLAN Access Points

It is known to realize so-called virtual WLAN access points: A single physical access point may operate as multiple access points with different configurations, i.e. different SSID's (network names), e.g. an open access point and an encrypted access point (see e.g. http://www.dd-wrt.com/wiki/index.php/Multiple_WLANs and http://www.z-eroshell.net/eng/wireless-access-point/#wifi-manager). It is also known to realize on a client multiple WLAN network adapters using a single WLAN card (see e.g. http://research.microsoft.com/en-us/um/redmond/projects/virtualwifi/ and http://blogs.technet.com/b/dmelanchthon/archive/2009/09/24/virtual-wifi-macht-windows-7-zum-access-point.aspx).

There exist different technologies for user-friendly security set-up. Detailed information is compiled in the sequel:

Wi-Fi Protected Setup (WPS)

Wi-Fi Protected Setup (WPS) defined by the Wi-Fi Alliance is the de-facto standard for WLAN security setup (see: http://en.wikipedia.org/wiki/Wi-Fi_Protected_Setup and: http://www.wi-fi.org/wifi-protected-setup). As part of the Push Button Configuration (PBC) protocol run, a check for an overlapping session is performed. If an overlapping PBC session is detected, the set-up procedure is aborted. The simultaneous announcement by a single device on two frequency bands is not considered as session overlap.

According to the WPS Specification 1.0 in Section 10.3, page 77 the following is known:

The button press or equivalent trigger event on the Enrollee causes it to actively search for a Registrar in PBC mode. However, the Enrollee MUST not proceed immediately with the Registration Protocol when it first discovers a Registrar. Instead, the Enrollee must complete a scan of all IEEE 802.11 channels that it supports to discover, if any other nearby Registrars are in a Push Button Configuration (PBC) mode. The Enrollee performs this scan by sending out probe requests with a Device Password ID indicating that the Enrollee is in PBC mode and receiving probe responses indicating a Selected Registrar with a PBC Device Password ID. During this scan, the Enrollee must abort its connection attempt and signal a "session overlap" error to the user if it discovers more than one Registrar in PBC mode. If a session overlap error occurs, the user should be advised through the Enrollee or the Registrar user interface (UI) or product literature to wait some period of time before trying again.

Note: In the case of a dual-band access point (AP) and a dual-band station, the station may discover more than one registrar in the PBC mode. If the dual-band station does discover more than one registrar in the PBC mode, one each RF band, and the Universal Unique IDentifier (UUID) in the beacon and probe-response are the same for all RF bands, then the station shall not consider this to be a session overlap.

WPS push-button configuration involves the new device to be registered (called Enrollee), an access point (AP) being in direct communication with the Enrollee and a Registrar that actually performs the registration (i.e. it establishes a credential with the Enrollee), which is shown with a message chart (WPS PBC Message Exchange known from WPS Specification 1.0) in FIG. 3. The registration messages (M1 . . . M8) are embedded in EAP messages that are forwarded by the AP.

Before the actual registration starts, a monitoring is performed to detect an overlapping PBC session: After Button press B_E by the Enrollee, the Enrollee sends probe request messages indicating that it is in a PBC mode. The AP forwards the information to the registrar. After a button press B_R or an equivalent trigger event on the registrar, the registrar checks whether more than one Enrollee PBC probe request has been received by the Registrar within 120 seconds prior to the PBC button press on the Registrar (PBC Monitor Time). If more than one Enrollee PBC probe request has been received within the Monitor Time interval, the Registrar signals a session overlap error and refuses to enter PBC mode or perform a PBC-based Registration Protocol exchange. In general, the two buttons B_E and B_R may be pressed in any order as long as both are pressed within a 120 sec time interval.

Note: The message SetSelectedRegistrar notifies the AP that the registrar is currently in PBC mode. So this message causes the change in behaviour of the AP that it answers with a PBC probe response message (positive answer "PBC" instead of negative answer "!PBC").

This technical solution has as main drawback that it is suitable only for a limited usage scenario: Only a single technology (WLAN) is supported.

The case of multiple access points (nodes) belonging to the same (home) network and each of them being potentially used for the PBC is not considered.

"Appendix A" in WPS Specification 1.0 in Section 13 describes a setup in which multiple registrars are supported, so that the user (Enrollee) has to select with which registrar it wants to register.

IEEE P1905.1

The current draft version of the standard IEEE P1905.1 includes the following description for the push button configuration in section 9.2.2(P1905.1 PBC (Push Button Configuration) Setup Method):

The IEEE P1905.1 PBC method works between two IEEE P1905.1 devices on the same IEEE P1905.1 Network, even when these two devices do not include an IEEE P1905.1 interface of the same underlying network technology if they are bridged by a device with the same underlying network technologies. FIG. 4 illustrates an example of the IEEE P1905.1 PBC method (IEEE P1905.1 Push-Button Event Notification and IEEE P1905.1 Push-Button Configuration).

In section 9.2.2.1 "P1905.1 Push Button Event Handling" of the current IEEE P1905.1 Draft Version "1905_1-11-0067-00-WGDC-proposal-for-cdhn-standard.doc" it is said:

The handling of IEEE P1905.1 Management messages in IEEE P1905.1 Devices is a common behaviour (powering up the interfaces and generating a sequential message ID across all message types from the device).

If the physical or logical PBC button is pushed on an IEEE P1905.1 Device and if an underlying network specific Push Button Configuration sequence is not currently being performed on any of the network interfaces of this IEEE P1905.1 Device, then a Push Button Event is triggered on an IEEE P1905.1 Device.

If a Push Button event is triggered on an IEEE P1905.1 Device, then the Application Layer Management Entity (ALME) shall:

Generate an eventID for this Push Button Event

Send a Push Button Event Notification IEEE P1905.1 Multicast message over its Authenticated IEEE P1905.1 Links using §7.2 Relay Multicast Transmission Procedures Initiate the underlying network specific Push Button Configuration sequence on the IEEE P1905.1 interfaces supporting Push Button Configuration methods.

FIG. 5 describes how an IEEE P1905.1 Device handles an IEEE P1905.1 Push Button Event Notification message (Push Button Event Notification Handling).

The handling of IEEE P1905.1 Management messages in an IEEE P1905.1 Device is a common behaviour (powering up the interfaces and generating a sequential message ID across all message types from the device).

If an ALME receives an IEEE P1905.1 Push Button Notification message, then an IEEE P1905.1 ALME shall:

1) If an underlying network specific Push Button Configuration sequence is currently being performed of any of the network interface of the device, then ignore the message.
2) If the message SourceAddress and eventID are a duplicated notification for this given P1905.1 Push Button event, then ignore the message.
   a) The aging of a SourceAddress and eventID pair is P1905.1_PBC_WALK_TIME.
   b) P1905.1_PBC_WALK_TIME should be defined to be longer than the underlying network. No more than a single eventID need to be stored by the P1905.1 device since Push_Button_Event cannot be triggered or handled if an underlying network Push Button Configuration is in progress (cf. 3.2.3 & 3.2.5-1).
3) If message is not ignored, repropagate the received IEEE P1905.1 Push_Button_Event Notification message using §7.3 Relay Multicast Reception Procedures.
4) Initiate the underlying network specific Push Button Configuration sequence on all IEEE P1905.1 interfaces supporting Push Button Configuration methods.

The main limitation of Wi-Fi WPS standard is that only a single WPS session including one new node and one Access Point (AP) node is supported (i.e. not a setup scenario involving multiple access points (AP)). This limits the applicability, e.g. in WLAN mesh networks according to IEEE 802.11 or IEEE P1905.1 networks.

An exemplary signalling flow according to the state of the art is shown in FIG. 6. The two network node devices D1, D2 belong to the same heterogeneous or homogeneous wireless network, e.g., an IEEE P1905.1 network or a single WLAN mesh network according to IEEE 802.11. Although only two network node devices D1, D2 are shown in the FIG. 6 it should be clear that the network can include more than these two devices. This means that besides the first network node device D1 the network can have at least one second network node device D2.

A Push Button Configuration (initiation of an automatic security bootstrapping) is started, here by a first Push Button Event PBE-1 triggered on a first network node device D1. A second network node device D2 belonging to the same network is informed by the first network node device D1 by sending a push button notification message PBN to the second network node device D2. Of the network node devices D1, D2 each network node device start a Push Button Configuration session (PBC session), e.g. a Wi-Fi Protected Setup session (WPS). A new device (third network node device) ND that is to be registered with the network to which the network node devices D1 and D2 belong, starts also a Push Button Configuration by a second Push Button Event PBE-2. A monitoring is performed according to the standard to detect overlapping PBC sessions. As here both network node devices D1 and D2 indicate the status of their started PBC by sending a beacon referring to the network node device D1 respectively D2 and the started PBC, the new device ND detects two simultaneous Push Button Configuration sessions, i.e. a session overlap. Thus the new device ND aborts the PBC session with a failure. The new device ND cannot distinguish this case that is expected to be successful from a case where a different device, e.g. an external device ED (cf. FIG. 8), which belongs to a neighbour or an attacker, is performing a PBC session.

SUMMARY

One potential object is to specify a method and network node device for controlling the run of technology specific Push-Button Configuration sessions within a heterogeneous or homogeneous wireless network as well as a heterogeneous or homogeneous wireless network detecting a session overlap within the network, whereby the session is related to a configuration session (bootstrapping session, setup session) that establishes a security configuration for encrypted communication over a wireless link.

The inventors propose an enhanced mechanism for controlling the run of technology specific Push Button Configuration sessions within a heterogeneous or homogeneous wireless network and a plurality of network node devices interconnected to each other via at least one interface and/or over multiple hops and authenticated or unauthenticated for the network by using a piece of information, e.g. a "Configuration Setup Session Identifier (CSSID)", for identifying a technology specific Push Button Configuration setup session.

This enables an automatic setup with session overlap detection being supported with multiple devices. Thus a protected WLAN Setup for Multiple Access Points and not only a point-to-point setup is possible.

When session overlap detection is performed, in particular as part of a push button configuration, the CSSID information allow to distinguish a single configuration setup session involving several nodes (belonging, however, to a single network) from the case of two different configuration setup sessions. The configuration setup session is aborted if two different setup sessions are detected during the monitoring time frame, i.e. two setup sessions having different CSSID's.

It is advantageous that the piece of information, e.g. the Configuration Setup Session Identifier (CSSID), is preferably generated randomly or pseudo-randomly when a configuration setup session is initiated, e.g. by pressing a button for a push button configuration.

It is also advantageous that—in a variant—the Configuration Setup Session Identifier (CSSID) is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

It is further advantageous that—in a variant—the Configuration Setup Session Identifier (CSSID) is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

It is moreover advantageous that—in one preferred variant—the Configuration Setup Session Identifier (CSSID) is generated as "commitment" value using a cryptographic one way function (the cryptographic hash function H), e.g. Message Digest Algorithm "MD5" or the Secure Hash Algorithms "SHA-1"; "SHA-256" etc. The Configuration Setup Session Identifier (CSSID) is computed as CSSID:=H(PIP)/H(R), where PIP/R is a parameter/value as described above. The Configuration Setup Session Identifier (CSSID) is used as before, but after completing the configuration setup or at least a part of the configuration setup, the pre-image parameter PIP/the value R is revealed.

The CSSID information may be protected by a cryptographic checksum, e.g. a digital signature. The CSSID information of different nodes may be signed by the same private key, proving that the sending nodes belong to the same network.

This prevents undetected stealing of a CSSID value, as only the entity that determined the CSSID value can reveal the corresponding pre-image parameter PIP. An outsider that intercepted only the CSSID value cannot practically determine the corresponding PIP value. So an attacker (third party) can use a different CSSID, but it cannot use the CSSID selected by another node.

The CSSID value may be determined by the registrar, by the access point, by a push button trigger sending node according to IEEE P1905.1.

It is moreover advantageous that the CSSID is included in the messages exchanged over the wireless link, whereas the wireless message could be a beacon message, a probe response, or an "Extensible Authentication Protocol over Local Area Network (EAPoL)"-message.

This CSSID value resp. the derived value allows a (new) node that is to be configured to detect whether multiple nodes (e.g., WLAN mesh access points) indicate a single configuration setup session (i.e. no overlap) or different setup sessions. The CSSID value and/or a derived value are included in wireless messages. It may be included in particular as in information element (data field), e.g. the "Wi-Fi Simple Config" information element (WSC IE). It may be included also in one or several of the messages M1, M2, M3, M4, M5, M6, M7, M8 (cf. FIG. 3).

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
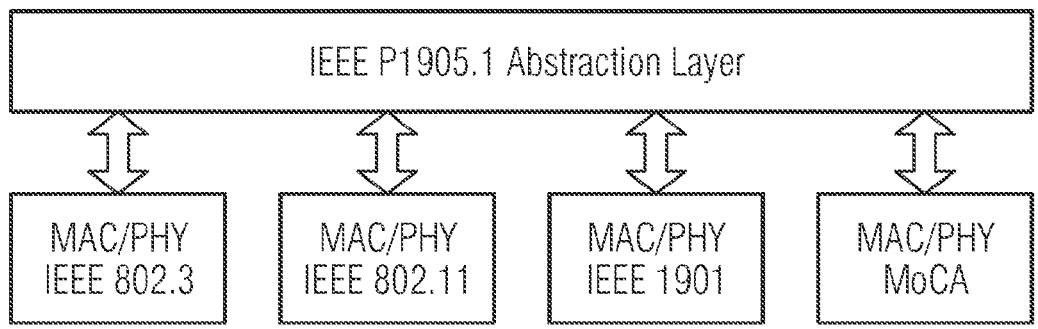
FIG. 1 shows how the "IEEE P1905.1" Abstraction Layer can support a heterogeneous grouping of network communication technologies.

Reference will now be made in detail to the preferred embodiments of the present invention, examples of which are illustrated in the accompanying drawings, wherein like reference numerals refer to like elements throughout.

Figure 6:
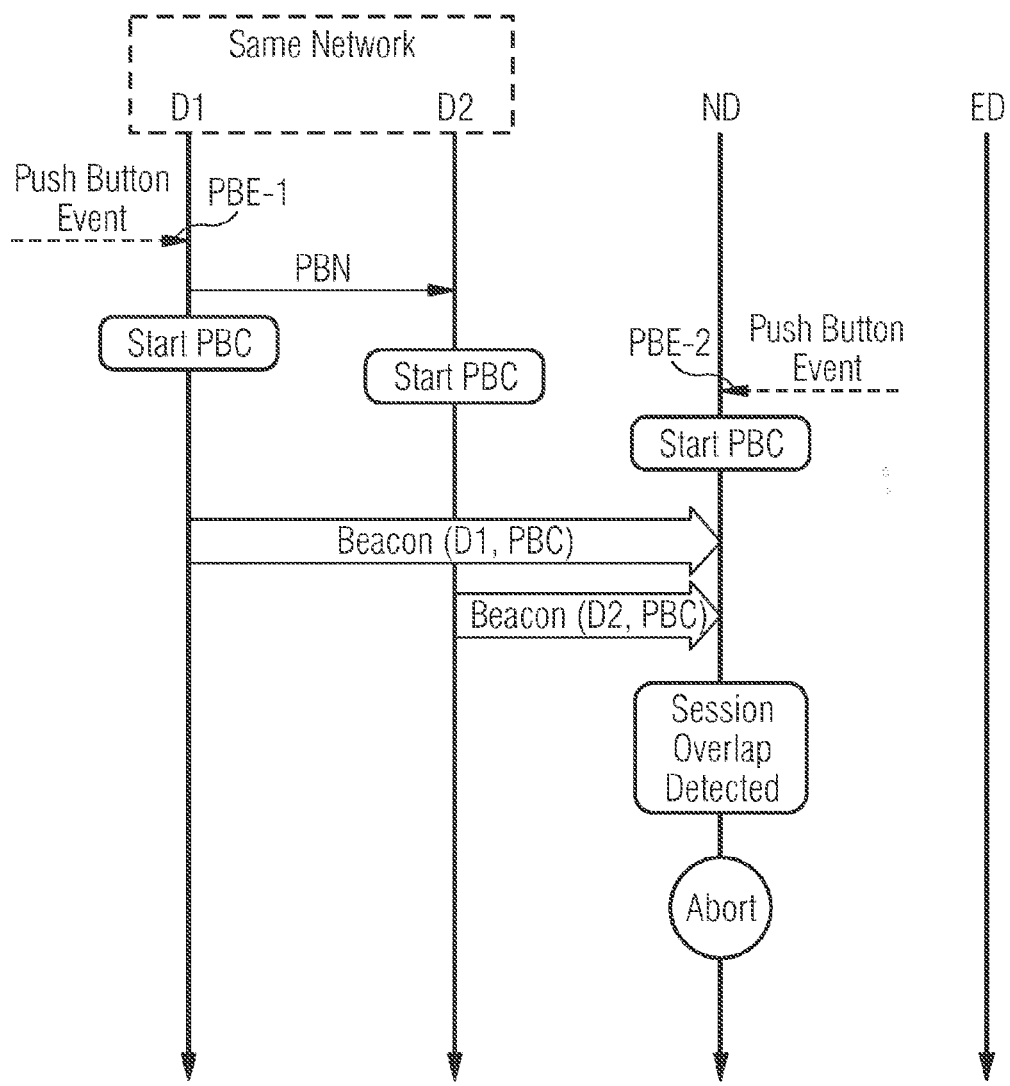
FIG. 6 shows an exemplary signaling flow according to the state of the art.
Figure 7:
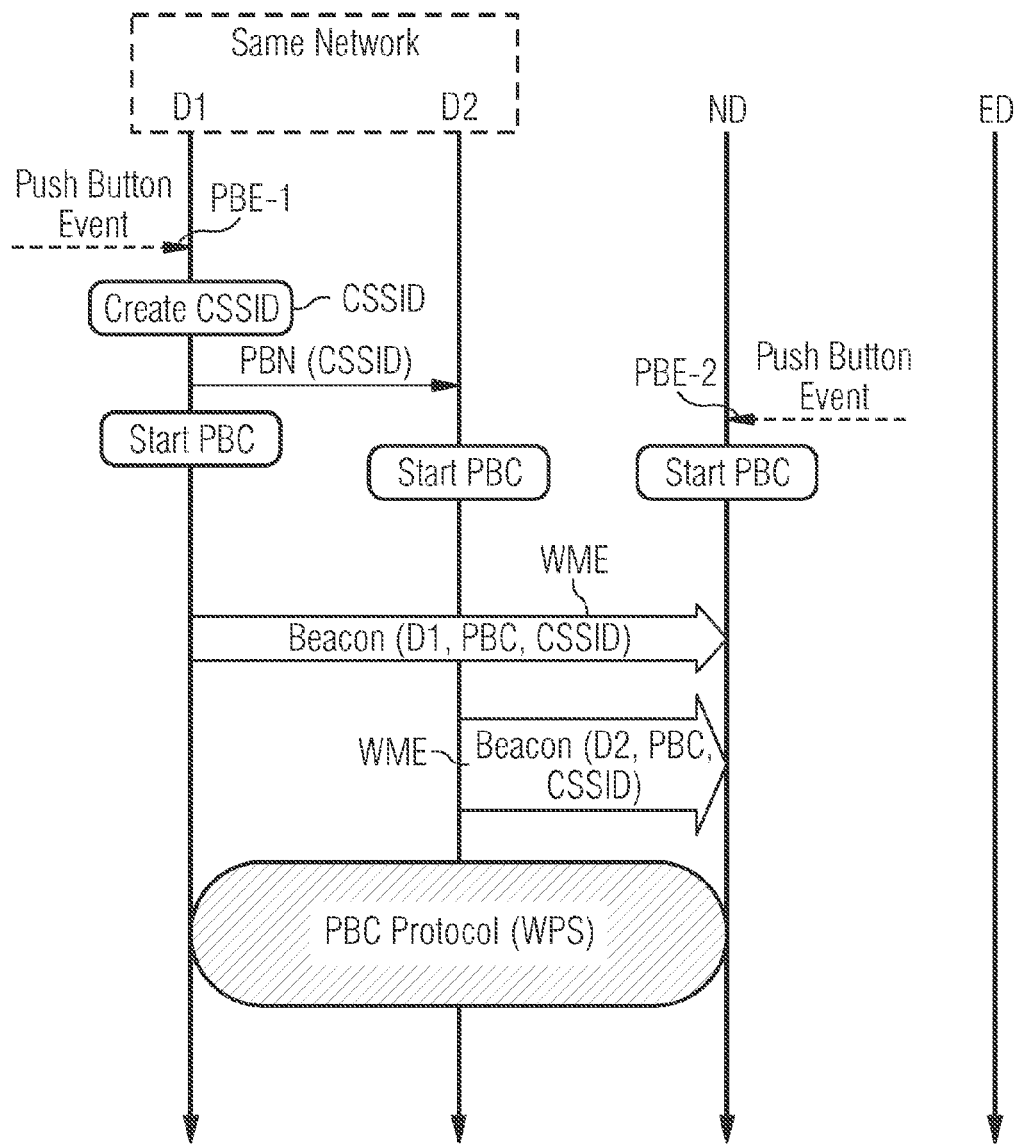
FIG. 7 is a sequence diagram based on FIG. 6 with the message flow (signaling flow) with a successful registration of a new device despite an overlap of PBC sessions.

FIG. 7 shows an exemplary signalling flow according to a preferred embodiment using a first Configuration Setup Session Identifier CSSID. As in the FIG. 6 the two network node devices D1, D2 belong to the same heterogeneous or homogeneous wireless network, e.g., an IEEE P1905.1 network or a single WLAN mesh network according to IEEE 802.11. Although only two network node devices D1, D2 are shown in the FIG. 7 it should be clear that the network can include more than these two devices. This means that besides the first network node device D1 the network can have at least one second network node device D2.

Again a Push Button Configuration (initiation of an automatic security bootstrapping) is started, here by a first Push Button Event PBE-1 triggered on a first network node device D1.

In contrast to the FIG. 6 the first network node device D1 creates the first Configuration Setup Session Identifier CSSID. The first Configuration Setup Session Identifier CSSID, is preferably generated randomly or pseudo-randomly, when the configuration setup session is initiated by pressing a button for a Push Button Configuration.

It is also possible that the first Configuration Setup Session Identifier CSSID is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the first Configuration Setup Session Identifier CSSID is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

Again in accordance to the FIG. 6 a second network node device D2 belonging to the same network is informed by the first network node device D1 by sending a push button notification message PBN to the second network node device D2. However, different to the situation in the FIG. 6 the push button notification message PBN transports the first Configuration Setup Session Identifier CSSID. Of the network node devices D1, D2 again each network node device start a Push Button Configuration session (PBC session), e.g. a Wi-Fi Protected Setup session (WPS).

Once more as in the FIG. 6 a new device (third network node device) ND that is to be registered with the network, to which the network node devices D1 and D2 belong, starts also a Push Button Configuration by a second Push Button Event PBE-2. A monitoring is performed according to the standard to detect overlapping PBC sessions.

Now both network node devices D1 and D2 indicate the status of their started PBC by sending messages over a wireless link, called as wireless messages WME. The first Configuration Setup Session Identifier CSSID is included in the wireless message WME. The wireless message WME could be a beacon message, a probe response, or an "Extensible Authentication Protocol over Local Area Network (EAPoL)"-message, which each also refers to the network node device D1 respectively D2 and the started PBC.

The new device ND detects again two simultaneous Push Button Configuration sessions, i.e. a session overlap, but due to the fact that the first Configuration Setup Session Identifier CSSID, which is sent with wireless message WME each by the network node devices D1, D2, is the same, the new device ND doesn't abort the PBC sessions. Instead of this it is running a technology specific Push Button Configuration session, e.g. a WPS session, with one of the network node devices D1, D2. According to the FIG. 7 it runs the PBC session with the first network node device D1.

Figure 8:
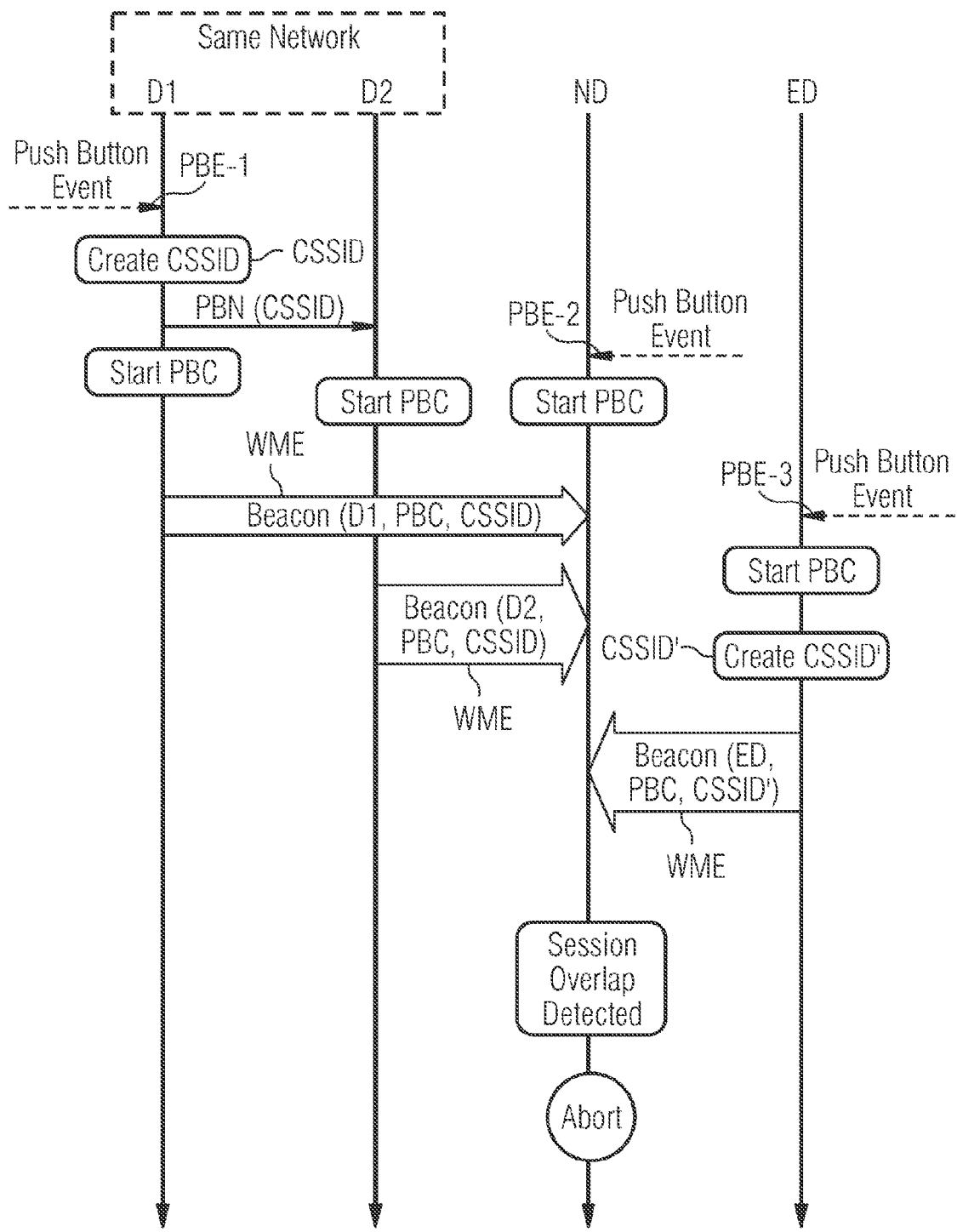
FIG. 8 is a sequence diagram based on FIG. 6 with the message flow (signaling flow) for detecting an overlap of PBC sessions with an abortion of running PBC sessions.

FIG. 8 shows based on the scenario shown in the FIG. 7 an exemplary signalling flow according to a preferred embodiment detecting an overlap of PBC sessions with an abortion of running PBC sessions by the Configuration Setup Session Identifier mechanism.

As in the FIG. 7 the two network node devices D1, D2 belong to the same heterogeneous or homogeneous wireless network, e.g., an IEEE P1905.1 network or a single WLAN mesh network according to IEEE 802.11. Although only two network node devices D1, D2 are shown in the FIG. 8 it should be clear that the network can include more than these two devices. This means that besides the first network node device D1 the network can have at least one second network node device D2.

Again the Push Button Configuration (initiation of the automatic security bootstrapping) is started, here by the first Push Button Event PBE-1 triggered on the first network node device D1.

The first network node device D1 creates the first Configuration Setup Session Identifier CSSID. The first Configuration Setup Session Identifier CSSID, is preferably generated randomly or pseudo-randomly, when the configuration setup session is initiated by pressing a button for a Push Button Configuration.

It is also possible that the first Configuration Setup Session Identifier CSSID is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the first Configuration Setup Session Identifier CSSID is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

The second network node device D2 belonging to the same network is informed by the first network node device D1 by sending the push button notification message PBN to the second network node device D2. The push button notification message PBN transports the first Configuration Setup Session Identifier CSSID. Of the network node devices D1, D2 again each network node device start a Push Button Configuration session (PBC session), e.g. a Wi-Fi Protected Setup session (WPS).

The new device (third network node device) ND that is to be registered with the network, to which the network node devices D1 and D2 belong, starts the Push Button Configuration by the second Push Button Event PBE-2. A monitoring is performed according to the standard to detect overlapping PBC sessions.

Now both network node devices D1 and D2 indicate the status of their started PBC by sending messages over a wireless link, called as wireless messages WME. The first Configuration Setup Session Identifier CSSID is included in the wireless message WME. The wireless message WME could be a beacon message, a probe response, or an "Extensible Authentication Protocol over Local Area Network (EAPoL)"-message, which each also refers to the network node device D1 respectively D2 and the started PBC.

The new device ND detects again two simultaneous Push Button Configuration sessions, i.e. a session overlap, but due to the fact that the first Configuration Setup Session Identifier CSSID, which is sent with wireless message WME each by the network node devices D1, D2, is the same, the new device ND would not abort the PBC sessions.

However, during the running time the aforementioned scenario happened, an external device ED, which e.g. belongs to a neighbour or an attacker, is performing a PBC session, too. It means that on the external device ED, triggered by a third Push Button Event PBE-3, a Push Button Configuration (initiation of an automatic security bootstrapping) is started.

As well as the first network node device D1 the external device ED creates a Configuration Setup Session Identifier, but it is different from the first Configuration Setup Session Identifier CSSID, because the external device does not belong to the heterogeneous or homogeneous wireless network and thus does not receive the push button notification message PBN. For this reason the identifier created by the external device ED is named as second Configuration Setup Session Identifier CSSID'.

The second Configuration Setup Session Identifier CSSID', is preferably generated randomly or pseudo-randomly, when the configuration setup session is initiated by pressing a button for a Push Button Configuration.

It is also possible that the second Configuration Setup Session Identifier CSSID' is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the second Configuration Setup Session Identifier CSSID' is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

Now the external device ED indicate the status of its started PBC by sending messages over a wireless link, called as wireless messages WME. The second Configuration Setup Session Identifier CSSID' is included in the wireless message WME. The wireless message WME could be a beacon message, a probe response, or an "Extensible Authentication Protocol over Local Area Network (EAPoL)"-message, which each also refers to the external device ED and the started PBC.

Since the new device ND receives now besides the two messages WME with the first Configuration Setup Session Identifier CSSID from the network node devices D1, D2 a further message WME with the second Configuration Setup Session Identifier CSSID' from the external device ED, it detects due to the different identifiers an overlap of PBC sessions. For this reason it aborts the PBC sessions and thus it runs no technology specific Push Button Configuration session with one of the first network node device D1, the second network node device D2 and the external device ED.

Figure 9:
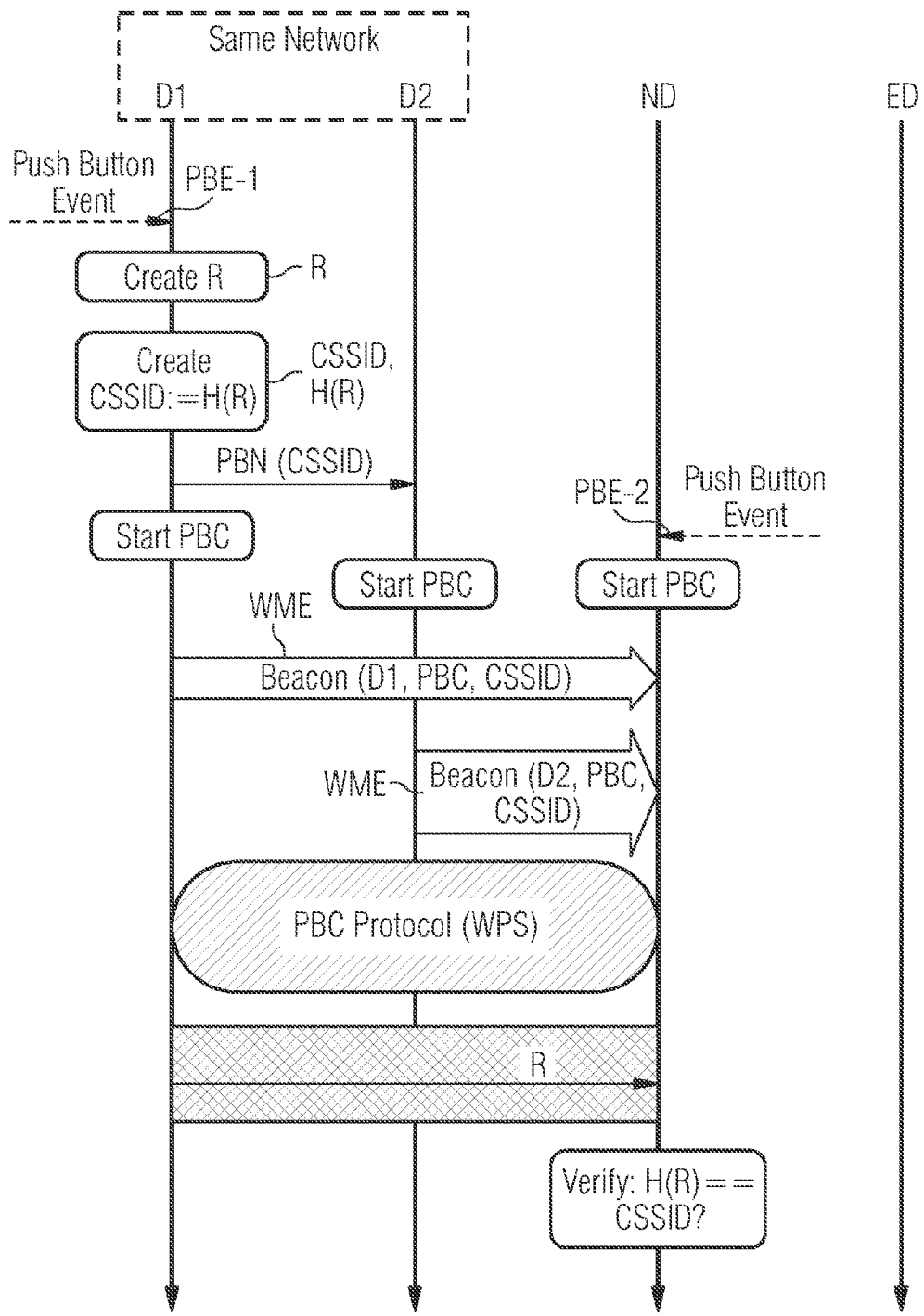
FIG. 9 is a sequence diagram with a modified message flow (signaling flow) with a successful registration of a new device despite an overlap of PBC sessions improving the controlling of running technology specific Push Button Configuration sessions shown in FIG. 7.

FIG. 9 shows based on the FIG. 7 a modified message flow (signalling flow) with a successful registration of a new device despite an overlap of PBC sessions improving the controlling of running technology specific Push Button Configuration sessions.

The improvement entails in that according to FIG. 9 the network node device using a Configuration Setup Session Identifier must prove to be the "owner" of the ID after having completed the configuration session setup. This can be done be using a cryptographic commitment value as Configuration Setup Session Identifier. After a cryptographic key has been established by the PBC protocol (WPS), the authorized usage of the CSSID value has to be committed by revealing a value R to the new device. The value of R is sent to the new device ND over the encrypted communication protected by the newly established key. This ensures that the value R is received only by the device ND.

In a variant, there are specific time ranges for PBC protocol run and for providing the value R. The protocol succeeds only successfully when starting, e.g. from PBC trigger of PBC protocol run, when the expected information is exchanged during the envisaged period.

As in the FIG. 7 the two network node devices D1, D2 belong to the same heterogeneous or homogeneous wireless network, e.g., an IEEE P1905.1 network or a single WLAN mesh network according to IEEE 802.11. Although only two network node devices D1, D2 are shown in the FIG. 7 it should be clear that the network can include more than these two devices. This means that besides the first network node device D1 the network can have at least one second network node device D2.

Again the Push Button Configuration (initiation of an automatic security bootstrapping) is started, here by the first Push Button Event PBE-1 triggered on the first network node device D1.

The first network node device D1 creates from the value R a cryptographic commitment value H(R) as the first configuration setup session identifier CSSID, using a cryptographic one way function (the cryptographic hash function H), e.g. Message Digest Algorithm "MD5" or the Secure Hash Algorithms "SHA-1"; "SHA-256" etc. The Configuration Setup Session Identifier CSSID is computed as CSSID:=H(R), where R is a value.

The Configuration Setup Session Identifier CSSID, is preferably generated randomly or pseudo-randomly, when the configuration setup session is initiated by pressing a button for a Push Button Configuration.

It is also possible that the Configuration Setup Session Identifier CSSID is calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the Configuration Setup Session Identifier CSSID is identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

The second network node device D2 belonging to the same network is informed by the first network node device D1 by sending a push button notification message PBN to the second network node device D2. The push button notification message PBN transports the created Configuration Setup Session Identifier CSSID. Of the network node devices D1, D2 again each network node device start a Push Button Configuration session (PBC session), e.g. a Wi-Fi Protected Setup session (WPS).

The new device (third network node device) ND that is to be registered with the network, to which the network node devices D1 and D2 belong, starts also a Push Button Configuration by a second Push Button Event PBE-2. A monitoring is performed according to the standard to detect overlapping PBC sessions.

Now both network node devices D1 and D2 indicate the status of their started PBC by sending messages over a wireless link, called as wireless messages WME. The created Configuration Setup Session Identifier CSSID is included in the wireless message WME. The wireless message WME could be a beacon message, a probe response, or an "Extensible Authentication Protocol over Local Area Network (EAPoL)"-message, which each also refers to the network node device D1 respectively D2 and the started PBC.

The new device ND detects again two simultaneous Push Button Configuration sessions, i.e. a session overlap, but due to the fact that the created Configuration Setup Session Identifier CSSID, which is sent with wireless message WME each by the network node devices D1, D2, is the same, the new device ND doesn't abort the PBC sessions. Instead of this it is running a technology specific Push Button Configuration session, e.g. a WPS session, with one of the network node devices D1, D2. According to the FIG. 9 it runs the PBC session with the first network node device D1.

For identifying the first specific configuration setup session and to prove the ownership of the identifier CSSID after the completion of the technology specific Push Button Configuration session between the first network node device D1 and the third network node device ND the first network node device D1 transmits after a cryptographic key has been established during the run of the technology specific Push Button Configuration session the value R via an encrypted communication protected by the cryptographic key to the third network node device ND, which verifies the cryptographic commitment value H(R) respectively the first configuration setup session identifier CSSID.

Figure 10:
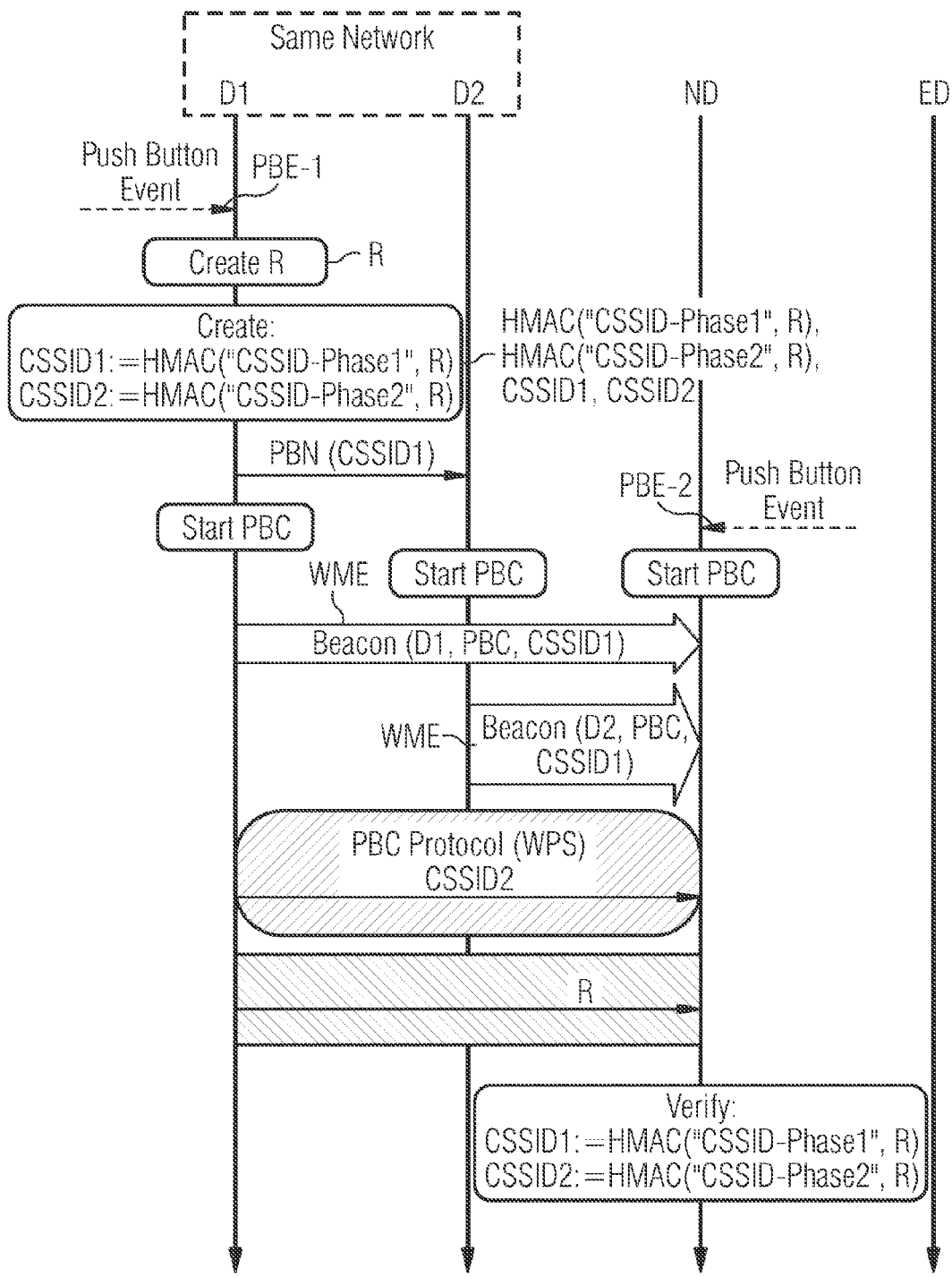
FIG. 10 is a sequence diagram with a further modified message flow (signaling flow) with a successful registration of a new device despite an overlap of PBC sessions further improving the controlling of running technology specific Push Button Configuration sessions shown in FIG. 7.

FIG. 10 shows based on the FIG. 7 a further modified message flow (signalling flow) with a successful registration of a new device despite an overlap of PBC sessions further improving the controlling of running technology specific Push Button Configuration sessions.

The improvement entails in that according to FIG. 10 two a cryptographic commitment values, a first cryptographic commitment value HMAC("CSSID-Phase1", R) as a Primary-Identifier CSSID1 and a second cryptographic commitment value HMAC("CSSID-Phase2", R) as a Secondary-Identifier CSSID2 are used. The first cryptographic commitment value HMAC("CSSID-Phase1", R) respectively the Primary-Identifier CSSID1 Primary-Identifier (CSSID1) is used instead of the first configuration setup session identifier CSSID for identifying the first specific configuration setup session. The second cryptographic commitment value HMAC("CSSID-Phase2", R) respectively the Secondary-Identifier CSSID2 is used to prove the knowledge of the value R during the run of the technology specific Push Button Configuration session between the first network node device D1 and the third network node device ND.

Instead of the "Hash based Message Authentication Code" (HMAC), a key derivation function or a message authentication code such as "Advanced Encryption Standard-Cyber Block Chaining-Message Authentication Code (AES-CBC-MAC)" may be used.

In a variant, also here there are specific time ranges for PBC protocol run and for providing the value R. The PBC protocol (WPS) succeeds only successfully when starting, e.g., from PBC trigger of PBC protocol run, when the expected information is exchanged during the envisaged period.

As in the FIG. 7 the two network node devices D1, D2 belong to the same heterogeneous or homogeneous wireless network, e.g., an IEEE P1905.1 network or a single WLAN mesh network according to IEEE 802.11. Although only two network node devices D1, D2 are shown in the FIG. 7 it should be clear that the network can include more than these two devices. This means that besides the first network node device D1 the network can have at least one second network node device D2.

Again the Push Button Configuration (initiation of an automatic security bootstrapping) is started, here by the first Push Button Event PBE-1 triggered on the first network node device D1.

The first network node device D1 creates from the value R, the configuration setup session identifier for a phase 1 CSSID-Phase1 and the configuration setup session identifier for a phase 2 CSSID-Phase2 based on a "Hash based Message Authentication Code" HMAC the first cryptographic commitment value HMAC("CSSID-Phase1", R) as the Primary-Identifier CSSID1, which is used instead of the first configuration setup session identifier CSSID for identifying the first specific configuration setup session, and the second cryptographic commitment value HMAC("CSSID-Phase2", R) as the Secondary-Identifier CSSID2, which is used to prove the knowledge of the value R during the run of the technology specific Push Button Configuration session between the first network node device D1 and the third network node device ND.

Both identifiers CSSID1, CSSID2, are preferably generated randomly or pseudo-randomly, when the configuration setup session is initiated by pressing a button for a Push Button Configuration.

It is also possible that the identifier CSSID1, CSSID2 are calculated using a derivation function, e.g. a cryptographic hash function as the Message Digest Algorithm "MD5" or the Secure Hash Algorithms "SHA-1"; "SHA-256", using parameters as the Basic Service Set Identifier "BSSID" and/or the client MAC Service Set Identifier "SSID" as derivation parameter.

Moreover is also possible that the identifiers CSSID1, CSSID2 are identical to or derived from an IEEE P1905.1 Push Button Event ID. Information characterizing the push button event trigger may be included as well (e.g., local push button, remote push button event; physical button, virtual button on a Graphical User Interface (GUI), user authentication information of user pressing the GUI push button, press duration, time stamp).

The second network node device D2 belonging to the same network is informed by the first network node device D1 by sending the push button notification message PBN to the second network node device D2. The push button notification message PBN transports the created Primary-Identifier CSSID1. Of the network node devices D1, D2 again each network node device start a Push Button Configuration session (PBC session), e.g. a Wi-Fi Protected Setup session (WPS).

The new device (third network node device) ND that is to be registered with the network, to which the network node devices D1 and D2 belong, starts also the Push Button Configuration by the second Push Button Event PBE-2. A monitoring is performed according to the standard to detect overlapping PBC sessions.

Now both network node devices D1 and D2 indicate the status of their started PBC by sending messages over a wireless link, called as wireless messages WME. The created Primary-Identifier CSSID1 is included in the wireless message WME. The wireless message WME could be a beacon message, a probe response, or an "Extensible Authentication Protocol over Local Area Network (EAPoL)"-message, which each also refers to the network node device D1 respectively D2 and the started PBC.

The new device ND detects again two simultaneous Push Button Configuration sessions, i.e. a session overlap, but due to the fact that the created Configuration Setup Session Identifier CSSID, which is sent with wireless message WME each by the network node devices D1, D2, is the same, the new device ND doesn't abort the PBC sessions. Instead of this it is running a technology specific Push Button Configuration session, e.g. a WPS session, with one of the network node devices D1, D2. According to the FIG. 10 it runs the PBC session with the first network node device D1. During this PBS session (PBS Protocol (WPS)) the Secondary-Identifier CSSID2 is transmitted from first network node device D1 to the new device ND.

For proving the knowledge of the value R during the run of the technology specific Push Button Configuration session between the first network node device D1 and the third network node device ND the first network node device D1 transmits after a cryptographic key has been established during the run of the technology specific Push Button Configuration session the value R via an encrypted communication protected by the cryptographic key to the third network node device ND, which verifies the cryptographic commitment values respectively the Primary-Identifier CSSID1 and the Secondary-Identifier CSSID2.

Figure 2:
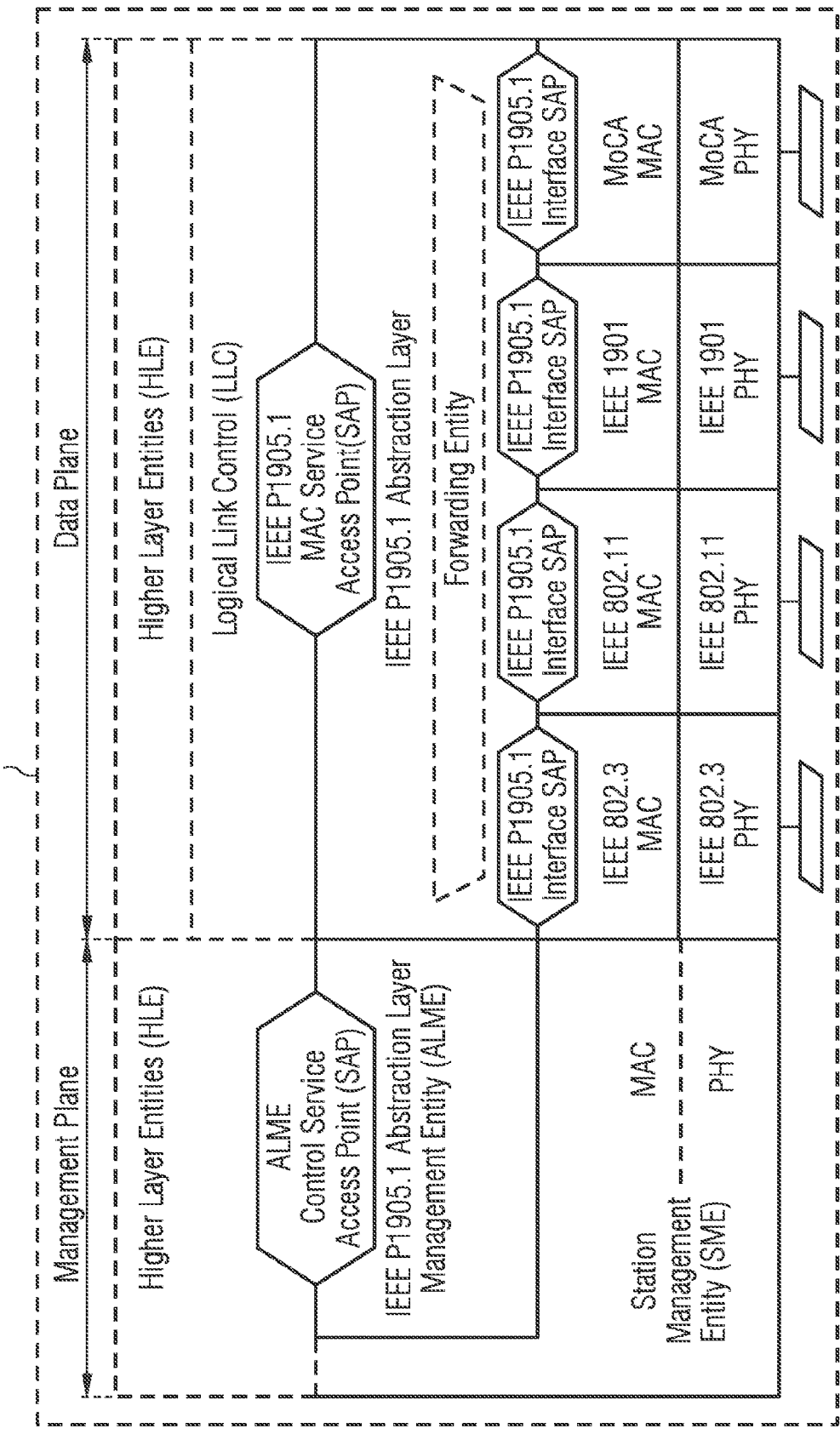
FIG. 2 shows the design of the abstraction layer based on the ISO/OSI-Reference Model with a management and data plane.
Figure 3:
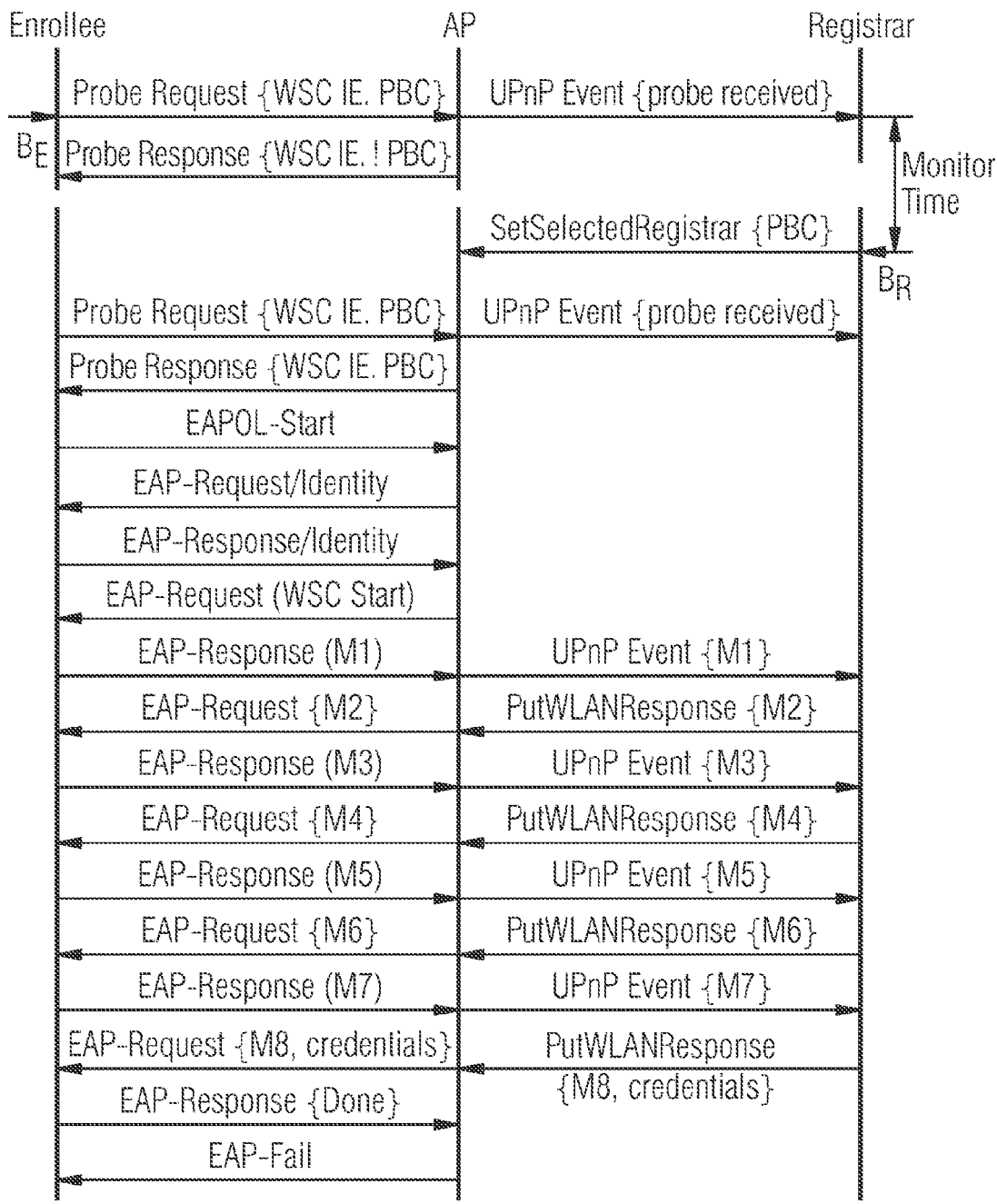
FIG. 3 shows the message chart for push-button configuration involving the new device to be registered, an access point being in direct communication with the device, and a Registrar that actually performs the registration.
Figure 4:
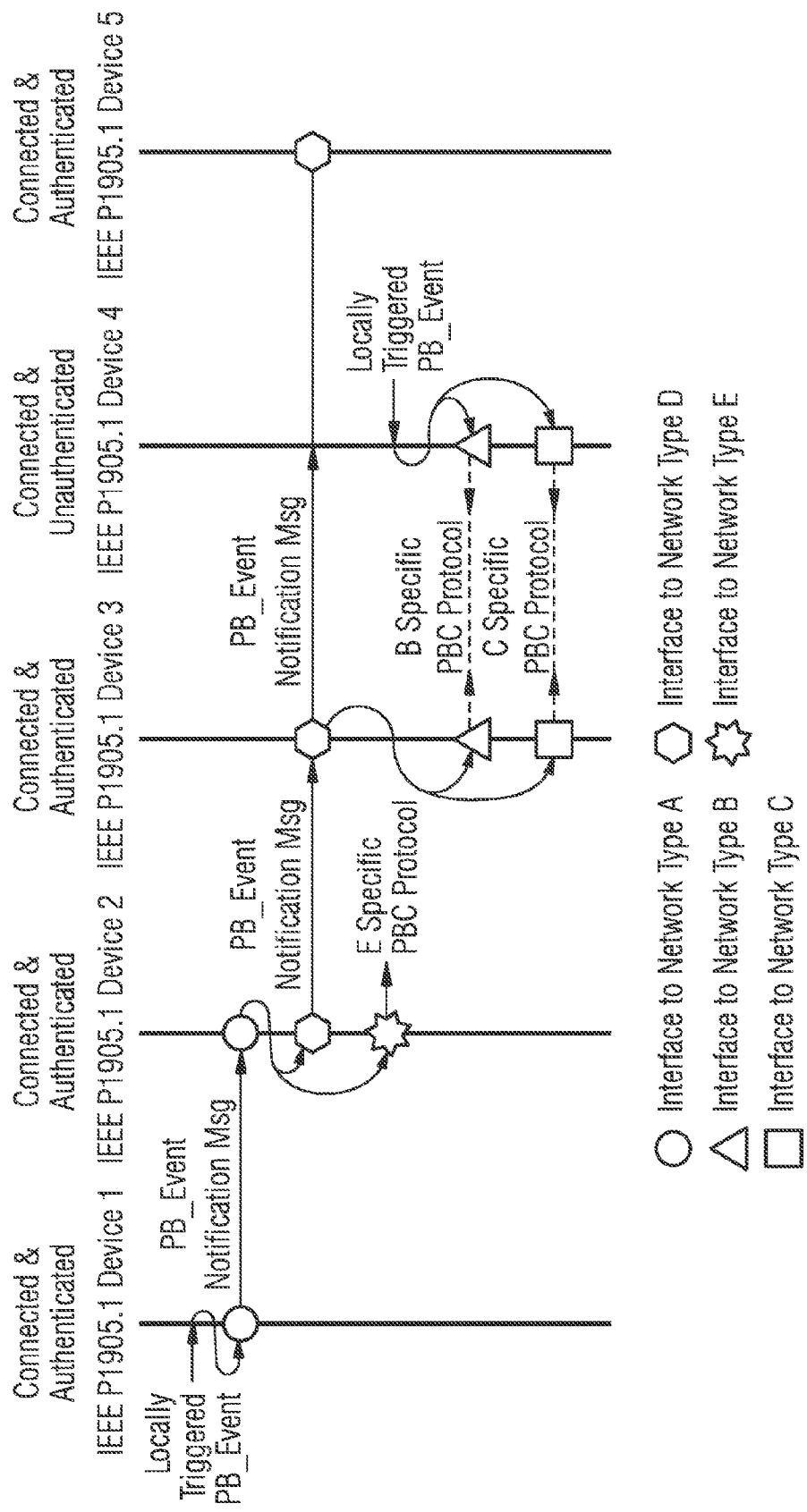
FIG. 4 shows and example of the IEEE P1905.1 PBC method is illustrated in (Example of IEEE P1905.1 Push-Button Event Notification and IEEE P1905.1 Push-Button Configuration).
Figure 5:
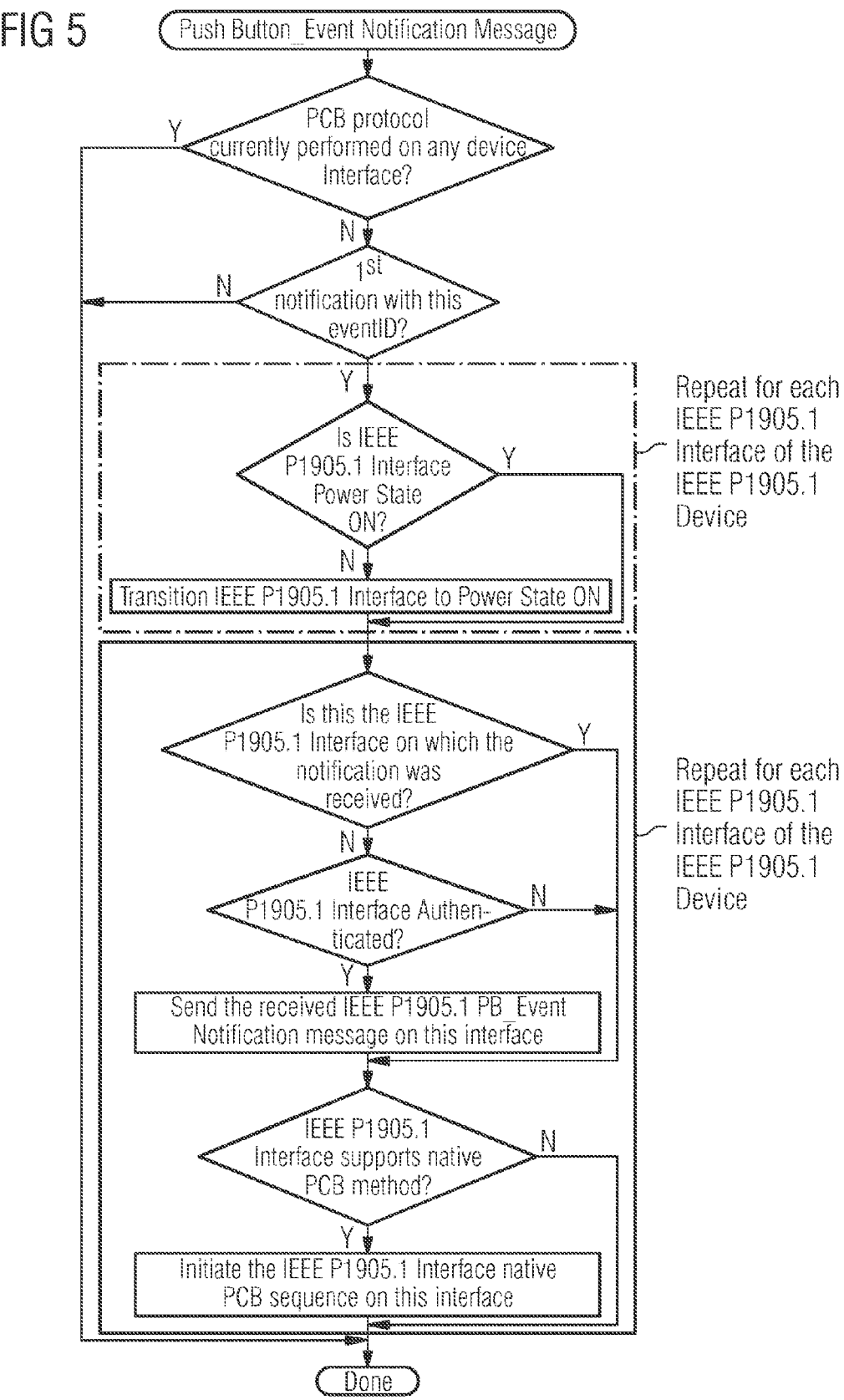
FIG. 5 shows how an IEEE P1905.1 Device handles an IEEE P1905.1 Push Button Event Notification message (Push Button Event Notification Handling).
Figure 11:
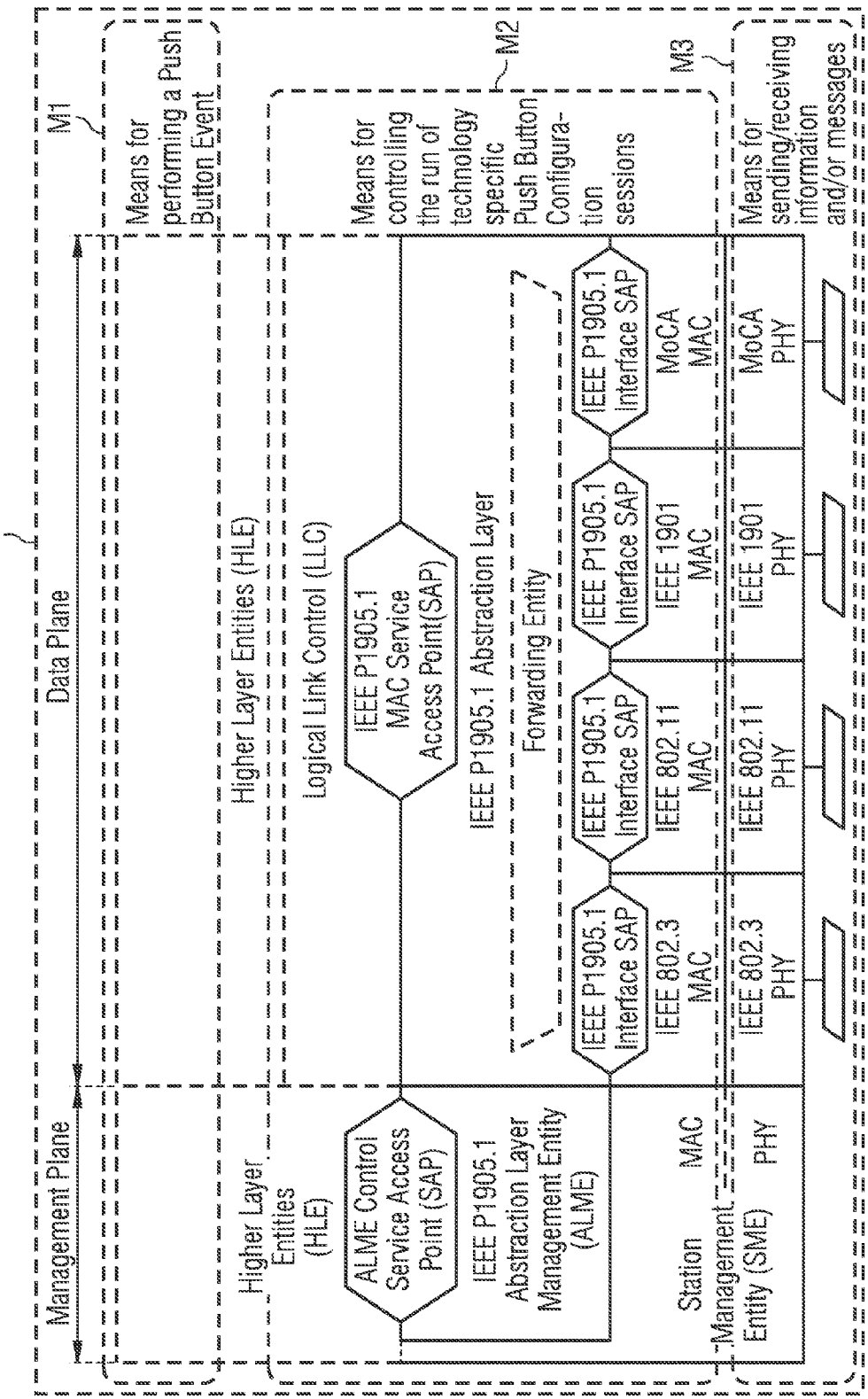
FIG. 11 shows the structure of a network node device for controlling the run of technology specific Push Button Configuration sessions within a heterogeneous or homogeneous wireless network based on the abstraction layer embedded in the IEEE P1905.1-Architecture above the Media Access Control (MAC)-layer and the Physical layer according to FIG. 2.

FIG. 11 shows the structure of the network node device D1, D2, especially the first network node device D1, each with at least one interface for controlling the run of technology specific Push Button Configuration sessions within a heterogeneous or homogeneous wireless network based on the abstraction layer embedded in the IEEE P1905.1-Architecture above the Media Access Control (MAC)-layer and the Physical layer according to FIG. 2. According to FIG. 11 the network node device D2, respectively the first network node device D1 comprise in contrast to the network node device NND of FIG. 2 dedicated mechanisms namely a mechanism for performing a Push Button Event (PBE) M1, a mechanism for controlling the run of technology specific Push Button Configuration sessions M2 and a mechanism for sending/receiving information and/or messages M3. While the mechanism M3 includes or incorporates all entities of the IEEE P1905.1-Architecture belonging to the Physical Layer and the mechanism M1 includes respectively incorporates the entities of the IEEE P1905.1-Architecture belonging to the Application Layer entities, which are part of the Higher Layer Entities (HLE), the mechanism for controlling the run of technology specific Push Button Configuration sessions M2 includes respectively incorporate all entities in the data- and management plane of the IEEE P1905.1-Architecture from the MAC-Layer including the Abstraction Layer with the IEEE P1905.1 Abstraction Management Entity (ALME) and the corresponding Service Access Points (SAP) via the Logical Link Control (LLC) up to the Higher Layers with its most entities.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for controlling technology specific Push Button Configuration sessions within a heterogeneous or homogeneous wireless network including a plurality of network node devices interconnected to each other via at least one interface and/or over multiple hops and authenticated or unauthenticated for the network, the method comprising:
   triggering an authenticated first network node device, by a first virtual or physical Push Button Event that is assigned to the first network node device, to directly or indirectly send a notification message to at least one second network node device, which has been authenticated, the notification message notifying the at least one second node device about the first Push Button Event;
   starting, by each of the first network node device and the at least one second network node device, a Push Button Configuration session;
   triggering an unauthenticated third network node device, by a second virtual or physical Push Button Event that is assigned to the third network node device, to start a technology specific Push Button Configuration session;
   creating, by the first network node device, a first configuration setup session identifier that identifies a first specific configuration setup session and transmitting the first configuration setup session identifier to the at least one second network node device in the notification message;
   sending, by each of the first network node device and the at least one second network node device within each respective Push Button Configuration session, the first configuration setup session identifier to the third network node device via at least one wireless message; and
   (a) running, by the third network node device, the technology specific Push Button Configuration session with one of the first network node device and the at least one second network node device, the third network node device running the technology specific Push Button Configuration session as a result of receiving the same configuration setup session identifier from the first network node device and the at least one second network node device, or
   (b1) triggering an unauthenticated external device that is not part of the network, by a third virtual or physical Push Button Event that is assigned to the external device, to start a Push Button Configuration session for the external device;
   (b2) creating a second configuration setup session identifier that identifies a second specific configuration setup session, the second configuration setup session identifier being created by external device;
   (b3) sending within the Push Button Configuration session for the external device, the second configuration setup session identifier from the external device to the third network node device via at least one second wireless message; and
   (b4) detecting a session overlap by the third network node device, aborting the technology specific Push Button Configuration session, and not running the technology specific Push Button Configuration session with any of the first network node device, the at least one second network node device, and the external device as a result of receiving the first and second configuration setup session identifiers that are different from each other from the first network node device, the at least one second network node device, and the external device.

2. The method according to claim 1, further comprising:
   creating, by the first network node device from a given value, a cryptographic commitment value as the first configuration setup session identifier; and
   when the technology specific Push Button Configuration session is run between the first network node device and the third network node device and after completion of the technology specific Push Button Configuration session, transmitting, by the first network node device, the given value to the third network node device via an encrypted communication that is protected by a cryptographic key that was established during running of the technology specific Push Button Configuration session in order to verify the first network node device as the owner of the first configuration setup session identifier.

3. The method according to claim 1, further comprising:
creating, by the first network node device from a given value, a first cryptographic commitment value that is used to identify the first specific configuration setup session instead of the first configuration setup session identifier and a second cryptographic commitment value, the second cryptographic commitment value being based on a Hash based Message Authentication Code (HMAC), a key derivation function, or a message authentication code;
when the technology specific Push Button Configuration session is run between the first network node device and the third network node device, transmitting, by the first network node device during running of the technology specific Push Button Configuration session, the second cryptographic commitment value to the third network node device; and
transmitting, by the first network node device, the given value to the third network node device via an encrypted communication protected by a cryptographic key that was established during running of the technology specific Push Button Configuration session in order to verify the first and second cryptographic commitment values as belonging to the first network node device.

4. The method according to claim 1, wherein the heterogeneous wireless network is a Convergent Digital Home Network based on the IEEE 1905.1 standardization specification, and
wherein the homogeneous wireless network is WLAN/Wi-Fi network based on the IEEE 802.11 standardization specification.

5. The method according to claim 1, wherein when the third network node device aborts the technology specific Push Button Configuration session:
the first and second configuration setup session identifiers are generated randomly or pseudo-randomly when the technology specific Push Button Configuration is started.

6. The method according to claim 1, wherein when the third network node device aborts the technology specific Push Button Configuration session:
the first and second configuration setup session identifiers are calculated using a derivation function with a Basic Service Set Identifier and/or a client MAC Service Set Identifier (SSID) as derivation parameters.

7. The method according to claim 1, wherein when the third network node device aborts the technology specific Push Button Configuration session:
the first and second configuration setup session identifiers are identical to an IEEE P1905.1 Push Button Event ID or derived from an IEEE P1905.1 Push Button Event ID.

8. The method according to claim 1, wherein the at least one wireless message is at least one of a beacon message, a probe response, and an Extensible Authentication Protocol over Local Area Network (EAPoL)-message and includes an information element or data field for transporting values and/or identifiers.

9. A first network node device for controlling technology specific Push Button Configuration sessions within a heterogeneous or homogeneous wireless network including the first network node device and a plurality of other network node devices authenticated or unauthenticated for the network or not part of the network, the plurality of other network node devices including at least one second network device, which has been authenticated, and an unauthenticated third network node device, the third network node device being triggered by a second virtual or physical Push Button Event that is assigned to the third network node device in order to start a technology specific Push Button Configuration session, the first network node device and plurality of other network node devices being interconnected to each other via at least one interface and/or over multiple hops, the first network node device comprising:
one or more processors configured to:
start a Push Button Configuration session by a first virtual or physical Push Button Event that is triggered by the first network node device;
send a notification message directly or indirectly to the at least one second network node device, the notification message notifying the at least one second network node device about the first virtual or physical Push Button Event;
create a first configuration setup session identifier that identifies a first specific configuration setup session and transmit the first configuration setup session identifier to the at least one second network node device in the notification message;
send, within the Push Button Configuration session, the first configuration setup session identifier to the third network node device via at least one wireless message; and
enable the third network node device to either:
(a) run the technology specific Push Button Configuration session with the first network node device or the at least one second network node device when the third network node device determines that the first configuration setup session identifier is the same as a configuration setup session identifier received from the at least one second network device, or
(b) to abort the technology specific Push Button Configuration and to run no technology specific Push Button Configuration session with one of the first network node device, the at least one second network node device and an external device, the technology specific Push Button Configuration session being aborted when the third network node device detects a session overlap and receives the first configuration setup session identifier and a second configuration setup session identifier that is different from the first configuration setup session identifier, the second configuration setup session identifier being created for identifying a second specific configuration setup session, the second configuration setup session identifier being sent to the third network node device within a Push Button Configuration session for the external device, via at least one first wireless message, the external device being an unauthenticated external device that is not part of the network and that is triggered by a third virtual or physical Push Button Event that is assigned to the external device in order to start the Push Button Configuration session for the external device.

10. The first network node device according to claim 9, wherein the one or more processors are further configured to:
create, from a given value, a cryptographic commitment value as the first configuration setup session identifier; and
when the technology specific Push Button Configuration session is run between the first network node device and the third network node device and after completion of the technology specific Push Button Configuration session, transmit the given value to the third network node device via an encrypted communication protected by a cryptographic key that was established during running of the technology specific Push Button Configuration session in order to verify the first network node device as the owner of the first configuration setup session identifier.

11. The first network node device according to claim 9, wherein the one or more processors are further configured to:
create, from a given value, a first cryptographic commitment value that is used to identify the first specific configuration setup session instead of the first configuration setup session identifier and a second cryptographic commitment value, the second cryptographic commitment value being based on a Hash based Message Authentication Code (HMAC), a key derivation function, or a message authentication code;
when the technology specific Push Button Configuration session is run between the first network node device and the third network node device, transmit, during running of the technology specific Push Button Configuration session, the second cryptographic commitment value to the third network node device; and
transmit the given value to the third network node device via an encrypted communication protected by a cryptographic key that was established during running of the technology specific Push Button Configuration session in order to verify the first and second cryptographic commitment values as belonging to the first network node device.

12. The first network node device according to claim 9, wherein the heterogeneous network is a Convergent Digital Home Network based on the IEEE 1905.1 standardization specification, and
wherein the homogeneous network is WLAN/Wi-Fi network based on the IEEE 802.11 standardization specification.

13. The first network node device according to claim 9, wherein when the technology specific Push Button Configuration session is not run with the third network node device:
the first and second configuration setup session identifiers are generated randomly or pseudo-randomly when the technology specific Push Button Configuration is started.

14. The first network node device according to claim 9, wherein when the technology specific Push Button Configuration session is not run with the third network node device:
the first and second configuration setup session identifiers are calculated using a Basic Service Set Identifier (BSSID) and/or a client MAC Service Set Identifier (SSID) as derivation parameters.

15. The first network node device according to claim 9, wherein when the technology specific Push Button Configuration session is not run with the third network node device:
the first and second configuration setup session identifiers are identical to an IEEE P1905.1 Push Button Event ID or derived from an IEEE P1905.1 Push Button Event ID.

16. The first network node device according to claim 9, wherein the at least one wireless message is at least one of a beacon message, a probe response, and an Extensible Authentication Protocol over Local Area Network (EAPoL)-message and includes an information element or data field for transporting values and/or identifiers.

17. A non-transitory computer readable storage media being executable by a processor for controlling technology specific Push Button Configuration sessions within a heterogeneous or homogeneous wireless network and a plurality of network node devices interconnected to each other via at least one interface and/or over multiple hops and authenticated or unauthenticated for the network, implemented in a first network node device according to claim 9.

18. A wireless network for controlling technology specific Push Button Configuration sessions comprising:
a first network node device according to claim 9; and
a plurality of other network node devices interconnected to each other via at least one interface and/or over multiple hops and authenticated or unauthenticated for the network, wherein the network carries out a method for controlling technology specific Push Button Configuration sessions within a heterogeneous or homogeneous wireless network including a plurality of network node devices interconnected to each other via at least one interface and/or over multiple hops and authenticated or unauthenticated for the network, the method comprising:
triggering an authenticated first network node device, by a first virtual or physical Push Button Event that is assigned to the first network node device, to directly or indirectly send a notification message to at least one second network node device, which has been authenticated, the notification message notifying the at least one second node device about the first Push Button Event;
starting, by each of the first network node device and the at least one second network node device, a Push Button Configuration session;
triggering an unauthenticated third network node device, by a second virtual or physical Push Button Event that is assigned to the third network node device, to start a technology specific Push Button Configuration session;
creating, by the first network node device, a first configuration setup session identifier that identifies a first specific configuration setup session and transmitting the first configuration setup session identifier to the at least one second network node device in the notification message;
sending, by each of the first network node device and the at least one second network node device within each respective Push Button Configuration session, the first configuration setup session identifier to the third network node device via at least one wireless message; and
(a) running, by the third network node device, the technology specific Push Button Configuration session with one of the first network node device and the at least one second network node device, the third network node device running the technology specific Push Button Configuration session as a result of receiving the same configuration setup session identifier from the first network node device and the at least one second network node device, or
(b1) triggering an unauthenticated external device that is not part of the network, by a third virtual or physical Push Button Event that is assigned to the external device, to start a Push Button Configuration session for the external device;
(b2) creating a second configuration setup session identifier that identifies a second specific configuration setup session, the second configuration setup session identifier being created by external device;
(b3) sending within the Push Button Configuration session for the external device, the second configuration setup session identifier from the external device to the third network node device via at least one second wireless message; and
(b4) detecting a session overlap by the third network node device, aborting the technology specific Push Button Configuration session, and not running the technology specific Push Button Configuration session with any of the first network node device, the at least one second network node device, and the external device as a result of receiving the first and second configuration setup session identifiers that are different from each other from the first network node device, the at least one second network node device, and the external device.

* * * * *